(No Model.)
E. THUNDERBOLT.
CLUTCH GEAR.
No. 602,568. Patented Apr. 19, 1898.
2 Sheets—Sheet 1.
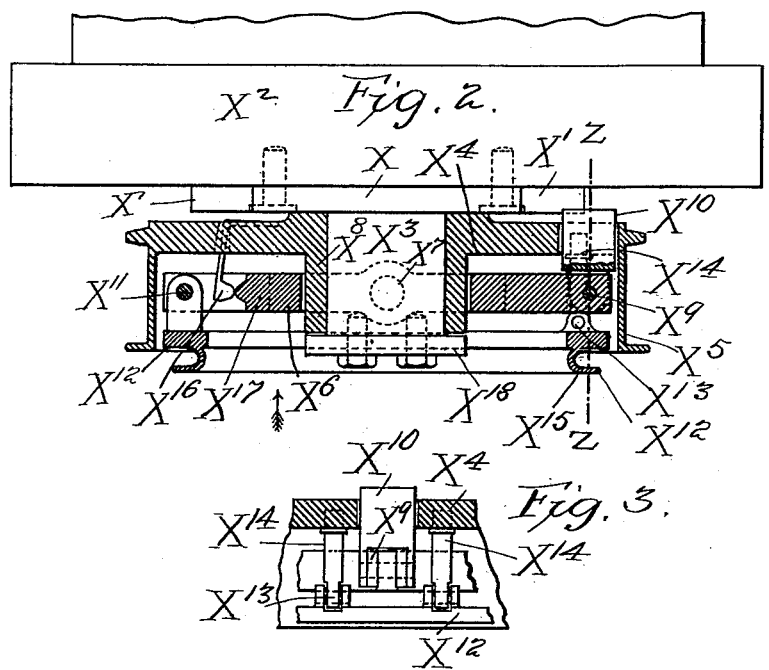
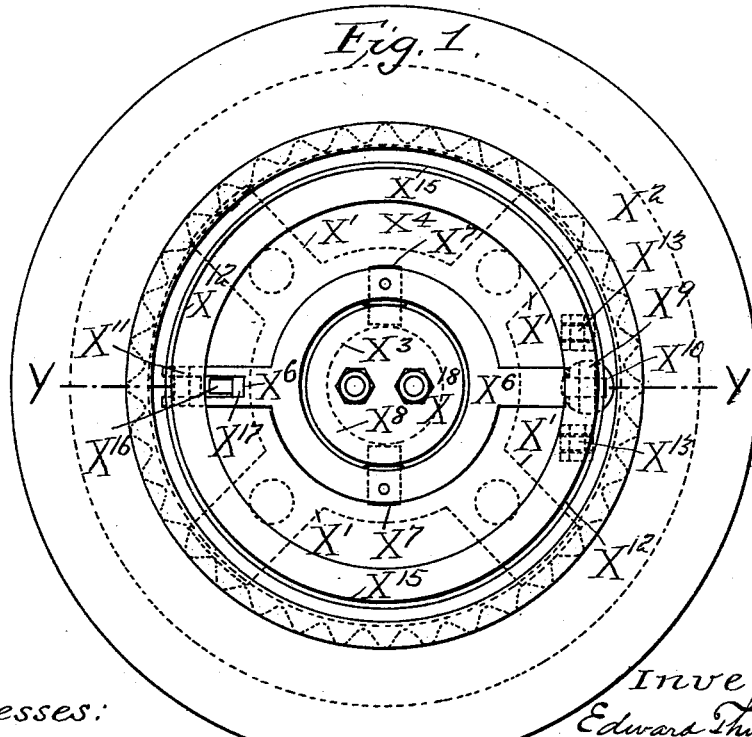
Witnesses:
E. B. Bolton
Inventor:
Edward Thunderbolt
By Richards
his Attorneys.

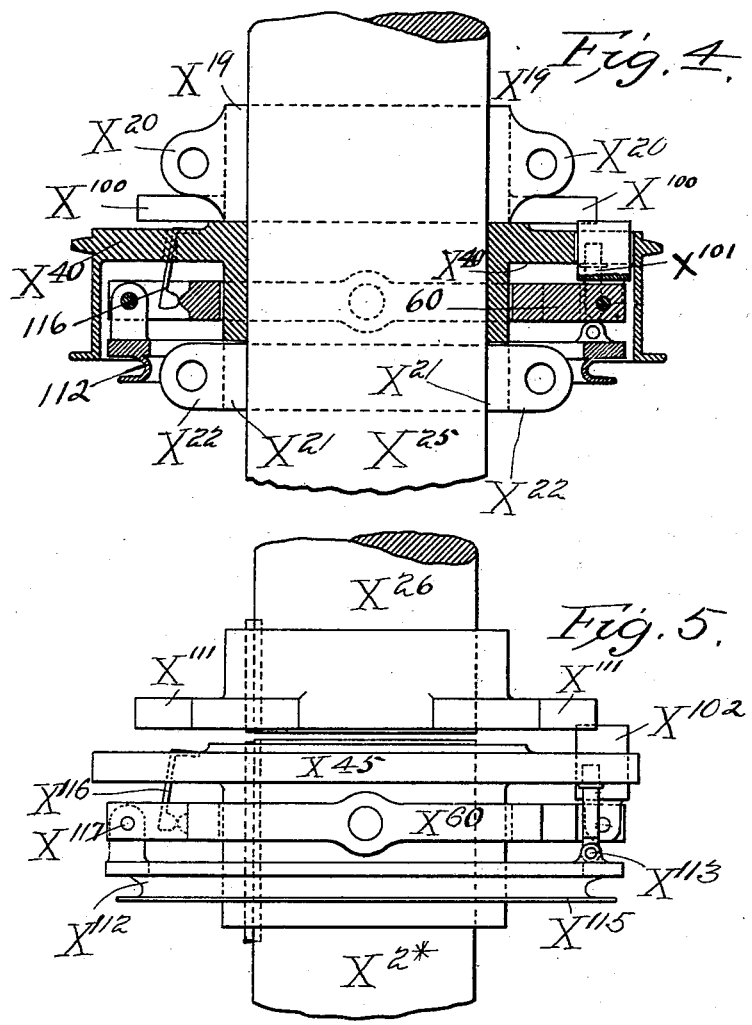

UNITED STATES PATENT OFFICE.

EDWARD THUNDERBOLT, OF CARLTON, VICTORIA.

CLUTCH-GEAR.

SPECIFICATION forming part of Letters Patent No. 602,568, dated April 19, 1898.

Application filed September 23, 1897. Serial No. 652,695. (No model.) Patented in England March 22, 1897, No. 7,410; in France March 27, 1897, No. 265,448; in Belgium April 3, 1897, No. 127,370; in Canada May 13, 1897, No. 55,925, and in Italy June 30, 1897, XLIV, 411.

*To all whom it may concern:*

Be it known that I, EDWARD THUNDERBOLT, engineer, a subject of the Queen of Great Britain, a resident of Drummond street, Carlton, in the Colony of Victoria, but at present residing at 158 Woodlands Road, Glasgow, Scotland, have invented a certain Improved Clutch-Gear for Connecting and Disconnecting Parts of Machinery, (for which I have obtained Letters Patent in Great Britain, dated March 22, 1897, No. 7,410; in France, dated March 27, 1897, No. 265,448; in Belgium, dated April 3, 1897, No. 127,370; in Italy, dated June 30, 1897, No. 44/411, and in Canada, dated May 13, 1897, No. 55,925,) of which the following is a specification.

This invention relates to clutch-gear for connecting and disconnecting a pulley, wheel, or other machinery to and from the shaft of the engine or other driving-shaft by which motion is communicated thereto or for connecting and disconnecting one shaft to and from another in line therewith.

In the accompanying drawings, Figure 1 is an elevation of a clutch-gear constructed in accordance with my invention and adapted to connect and disconnect a wheel or pulley $X^4$ to and from a shaft $X^2$, on the end of which the said wheel or pulley is mounted—as, for example, on the fore end of a marine-engine shaft—for the purpose of driving a governor. Fig. 2 is a sectional view of the same, taken on line Y Y of Fig. 1. Fig. 3 is a sectional view taken on line Z Z of Fig. 2. Fig. 4 is a sectional view of a slightly-modified arrangement of same as applied to some part of the length of a shaft, and Fig. 5 a view of a further modification adapted to connect and disconnect a driving-shaft to and from another shaft in line with the same.

X in Figs. 1 and 2 represents a disk, with arms or stops X' bolted to the end of the engine-shaft $X^2$.

$X^3$ is a boss standing at right angles to the disk X.

$X^4$ is a pulley or wheel mounted on the boss $X^3$ and adapted to rotate freely thereon. This pulley may be provided with teeth, as shown, adapted to take into the links of a pitch-chain, by which motion is to be communicated from the engine-shaft $X^2$ to the corresponding pulley of the governor or other machinery to which motion is to be communicated, or it may be provided with ordinary teeth for transmitting motion through toothed wheelwork to such governor or other machinery, or with a rope-groove or a strap-pulley $X^5$ for transmitting motion thereto by means of a rope or belt or otherwise.

$X^6$ is a lever pivoted on gudgeons $X^7$, fixed in the boss $X^8$ of the pulley $X^4$. One end of the lever is pin-jointed at $X^9$ to a bolt $X^{10}$, sliding in an opening in the pulley $X^4$. The other end of the lever $X^6$ is pin-jointed at $X^{11}$ to a ring $X^{12}$, which is pivoted at $X^{13}$ to studs $X^{14}$, fixed to the pulley $X^4$. The ring $X^{12}$ is provided with a grooved or U-shaped flange $X^{15}$.

$X^{16}$ is a spring-latch fixed to the pulley $X^4$ and adapted to take to one side or other of the projection $X^{17}$ on the lever $X^6$, according as the free end of the latter is pushed inward toward the end of the shaft $X^2$ or drawn outward therefrom.

$X^{18}$ is a plate bolted to the end of the boss $X^3$ for the purpose of retaining the pulley $X^4$ in place on the said boss.

It will now be understood that when pressure is exerted upon the ring $X^{12}$ in the direction of the arrow in Fig. 2 the lever $X^6$ is caused to turn on its gudgeons $X^7$ and to draw the bolt $X^{10}$ out clear of the arms X' of the disk X, and the latch $X^{16}$ takes outside the projection $X^{17}$, whereby the said bolt is held in that position and motion is not communicated from the shaft $X^2$ to the pulley $X^4$ and the governor or other machinery remains stationary. When, however, the lever $X^6$ is drawn outward in a direction opposite to that indicated by the arrow in Fig. 2 by means of any suitable instrument applied to the flange $X^{15}$ of the ring $X^{12}$, the bolt $X^{10}$ is pushed forward, so as to take into one or other of the spaces between the arms X'. One of the latter then communicates motion through the bolt to the pulley $X^4$, and the governor or other machinery is thereby set in motion. The spring-latch $X^{16}$ slips over the projection $X^{17}$ as the lever $X^6$ is pushed inward and takes behind the other side of such projection, thereby locking the lever and bolt, so as to keep the latter in gear with the arms X' until the ring $X^{12}$ is again pushed inward to disengage the bolt from the arms.

In the modification shown in Fig. 4 instead of the arms $X^{100}$ being bolted to the end of the shaft $X^{25}$ they are connected with a clip $X^{19}$, secured to the shaft by suitable means, as by bolts passing through lugs $X^{20}$, formed on the said clip, for example, or otherwise, and the pulley $X^{40}$ is adapted to rotate freely on the shaft $X^{25}$, being prevented from moving endwise thereon by a suitable collar or by a clip $X^{21}$, secured to the shaft by bolts passing through lugs $X^{22}$ or otherwise. The action of this modification is exactly the same as that described in reference to Figs. 1, 2, and 3.

In the arrangements of clutch-gear above described the pulley or wheel $X^{40}$ is supposed to be driven by the shaft $X^{25}$; but it is obvious that the same arrangements are applicable to the case where the said pulley or wheel drives the shaft, the only difference being that in the latter case the bolt $X^{101}$ drives the arms $X^{100}$, while in the former case the arms drive the bolt.

It is obvious that instead of the above-described clutch-gear being applied to connect and disconnect a pulley or wheel to and from a shaft it may be applied, by suitable modifications, to connect and disconnect other parts of machinery to and from a driving or driven shaft. For example, it may be applied to connect and disconnect a driving-shaft to and from another shaft in line with the same, as shown in Fig. 5, by securing the arms $X^{111}$ at or near the end of one shaft $X^{26}$ and the rest of the gear at or near the end of the other shaft $X^{2*}$; but in that case the bolt $X^{102}$ passes through a disk or other suitable guide-piece $X^{45}$, fixed on the said shaft $X^{2*}$, and the lever $X^{60}$ is pivoted on the boss of the said disk or otherwise directly or indirectly to such shaft, the latch $X^{116}$ being fixed to the disk or guide-piece $X^{45}$. The operating-ring $X^{112}$ $X^{115}$ is pivoted at $X^{113}$ to the disk or guide-piece $X^{45}$ or otherwise directly or indirectly to the shaft $X^{2*}$ and is connected at $X^{117}$ to the lever $X^{60}$. The action of this modification is exactly the same as that of the other arrangements described.

I claim—

1. In clutch mechanism for connecting a driving-shaft with a driven element, the combination with said driving-shaft, of a pulley or wheel rotatably sustained in proximity to said driving-shaft, a lever pivoted to said pulley, a bolt connected to said lever and adapted to slide through an opening in said pulley or wheel, arms or stops carried by the shaft adapted to be engaged by said bolt, and an operating-ring pivoted to the pulley and connected with the said lever, substantially as described.

2. Clutch mechanism for connecting and disconnecting a pulley or wheel to and from the driving-shaft, comprising a pulley or wheel $X^{40}$ loosely mounted on the shaft, a lever $X^{60}$ pivoted to said pulley, a bolt $X^{101}$ connected to said lever and adapted to slide through an opening in said pulley or wheel, arms or stops $X^{100}$ secured on the shaft and adapted to be engaged by said bolt, a spring-latch $X^{116}$ to hold the said lever and bolt in position, and an operating-ring $X^{112}$ pivoted to the said pulley $X^{40}$ and connected to the lever $X^{60}$, substantially as described.

In witness whereof I have hereunto set my hand in presence of two witnesses.

EDWARD THUNDERBOLT.

Witnesses:
GEO. R. BAKER,
ANDREW MURRAY.